US 8,561,882 B2

(12) United States Patent
Stone et al.

(10) Patent No.: US 8,561,882 B2
(45) Date of Patent: Oct. 22, 2013

(54) SAFETY NET FOR BAR-CODED DOCUMENTS

(75) Inventors: Steven James Stone, Urbana, IL (US); Andrew Cosand, Menlo Park, CA (US); Reuben Lev Goodman, Cambridge, MA (US); Robert Derek Dunn, Winchester, MA (US); Kathryn L. Hagerty, Somerville, MA (US)

(73) Assignee: athenahealth, Inc., Watertown, MA (US)

( * ) Notice: Subject to any disclaimer, the term of this patent is extended or adjusted under 35 U.S.C. 154(b) by 23 days.

(21) Appl. No.: 13/025,735

(22) Filed: Feb. 11, 2011

(65) Prior Publication Data

US 2012/0205432 A1   Aug. 16, 2012

(51) Int. Cl.
*G06F 17/00* (2006.01)
*G06F 3/12* (2006.01)
*G06K 7/10* (2006.01)
*H04N 1/40* (2006.01)
*G06Q 10/00* (2012.01)
*G06Q 50/00* (2012.01)

(52) U.S. Cl.
USPC ............... 235/375; 235/462.01; 358/1.15; 358/3.28; 705/2; 705/3

(58) Field of Classification Search
USPC ........... 235/375, 462.01, 494; 358/1.14, 1.15, 358/400, 403, 442, 448, 468, 474, 3.28; 705/2–4
See application file for complete search history.

(56) References Cited

U.S. PATENT DOCUMENTS

| | | | | |
|---|---|---|---|---|
| 5,319,543 A | * | 6/1994 | Wilhelm | 705/3 |
| 5,381,457 A | * | 1/1995 | Burns | 378/166 |
| 5,930,759 A | * | 7/1999 | Moore et al. | 705/2 |
| 6,332,149 B1 | * | 12/2001 | Warmus et al. | 715/246 |
| 6,467,763 B1 | * | 10/2002 | Depoi et al. | 270/52.09 |
| 7,580,164 B2 | * | 8/2009 | Barrus et al. | 358/474 |
| 2004/0078337 A1 | * | 4/2004 | King et al. | 705/51 |
| 2004/0162831 A1 | * | 8/2004 | Patterson | 707/100 |
| 2005/0219560 A1 | * | 10/2005 | Bratnober | 358/1.5 |
| 2007/0177227 A1 | * | 8/2007 | Kamasuka et al. | 358/474 |
| 2008/0174790 A1 | * | 7/2008 | Noguchi et al. | 358/1.1 |
| 2009/0161149 A1 | * | 6/2009 | Noguchi et al. | 358/1.15 |

OTHER PUBLICATIONS

"The Revitalized Demand for an Automated Document Factory," Böwe Bell + Howell White Paper, Apr. 17, 2009, pp. 1-9.
"The Move to Intelligent Mail: What mailers need to know," Böwe Bell + Howell White Paper, Apr. 2, 2009, pp. 1-3.

* cited by examiner

*Primary Examiner* — Michael G Lee
*Assistant Examiner* — Suezu Ellis
(74) *Attorney, Agent, or Firm* — Wolf, Greenfield & Sacks, P.C.

(57) ABSTRACT

A method and system for generating and processing barcoded documents such that a safety net may be implemented to catch barcode errors. Barcodes may be generated for placement on the first and last page of documents. Each barcode may be associated with a document. During processing of barcoded documents, if a barcode is missing or misread, the safety net will catch the error and mark the affected pages for further review.

17 Claims, 8 Drawing Sheets

SAFETY NET FOR BAR-CODED DOCUMENTS

TECHNICAL FIELD

The present invention relates generally to the processing of barcoded documents, and more specifically relates to the automated detection of errors while processing barcoded documents.

BACKGROUND

With the advent of electronic medical records (EMRs), many healthcare providers have adopted procedures to enter most (or all) incoming information into one or more computer databases so that the information may be readily accessible to doctors, nurses, or other clinical staff who require it. Documents within EMRs vary widely in their content and their source. For example, EMRs may contain lab reports, prescriptions, doctors' notes and many other types of documents. To streamline the creation and management of EMRs, it is convenient for healthcare providers to send all documents destined for EMRs to a single location for processing. To reduce the amount of duplicative work done by healthcare providers and the maintainers of the EMRs, documents may contain barcodes. The barcodes allow a large number of documents to be received and processed efficiently by scanning the barcode. Documents with barcodes already have an associated document record in the system that associates the document with, for example, a particular patient or type of document without the need for further human processing. The document may be saved directly to the appropriate EMR with far less effort than if a human had to read the document and classify the document manually.

SUMMARY

Applicants herein have discovered a need for a procedure for creating barcoded documents and processing a collection of barcoded documents that will detect and report barcode reading errors. This "safety net" will save time and effort in correcting these errors.

Some embodiments of the present invention are directed to a method of creating barcoded documents. The method comprises receiving documents characteristics comprising at least information pertaining to whether the document is a single page or multiple pages, creating a document record based on a portion of the document characteristics, generating a first barcode associated with the document record, printing the first barcode, and attaching the first barcode to a first page of the barcoded document. If the document is multiple pages, generating and printing a second barcode, and attaching the second barcode to the last page of the document.

Some embodiments of the present invention are directed to an apparatus for creating barcoded documents. The apparatus comprises an input module for receiving information related to whether the document is a single page or multiple pages, a records module for creating a document record based on a portion of the document characteristics, a barcode module for generating a first barcode associated with the document record, and, if the document is multiple pages, generating a second barcode, and a printing module for printing the barcodes.

Some embodiments are directed to a computer-readable medium, encoded with a series of instructions, that when executed on a computer, perform a method of creating a barcoded document. The method comprises receiving documents characteristics comprising at least information pertaining to whether the document is a single page or multiple pages, creating a document record based on a portion of the document characteristics, generating a first barcode associated with the document record, printing the first barcode, and attaching the first barcode to a first page of the barcoded document. If the document is multiple pages, generating and printing a second barcode, and attaching the second barcode to the last page of the document.

Some embodiments are directed to a method of processing a plurality of barcoded documents. The method comprises scanning a first barcode on the first page of a first document, determining whether the first document comprises more than one page, if the first document is determined to comprise more than one page, locating a second page that contains a second barcode, scanning the second barcode, determining if the second barcode corresponds to the first barcode, and if the second barcode is determined to correspond to the first barcode, marking the first page, the second page, and all pages between the first and second page as part of the first document.

Some embodiments are directed to a computer-readable medium, encoded with a series of instructions, that when executed on a computer, perform a method of processing a plurality of barcoded documents. The method comprises scanning a first barcode on the first page of a first document, determining whether the first document comprises more than one page, if the first document is determined to comprise more than one page, locating a second page that contains a second barcode, scanning the second barcode, determining if the second barcode corresponds to the first barcode, and if the second barcode is determined to correspond to the first barcode, marking the first page, the second page, and all pages between the first and second page as part of the first document.

BRIEF DESCRIPTION OF DRAWINGS

The accompanying drawings are not intended to be drawn to scale. In the drawings, each identical or nearly identical component that is illustrated in various figures is represented by a like reference character. For purposes of clarity, not every component may be labeled in every drawing. In the drawings.

DETAILED DESCRIPTION

The present disclosure generally relates to inventive methods and apparatus for generating and processing barcoded documents. Though some embodiments may be directed to electronic medical records (EMRs), the invention is not so limited.

While the deployment of systems for the management of EMRs has increased dramatically over the past decade, much of the information that should be included as part of the electronic record is often received using conventional paper-based means such as via courier, mail or facsimile. Accurate routing of incoming paper documents may require that each document be manually classified and sent to appropriate data entry personnel for entry of the data into an electronic database.

Various types of service provider entities, including, but not limited to, healthcare providers, insurance agencies, and mortgage brokers, may receive large quantities of faxed documents over the course of hours, days, or weeks. For the purposes of the present disclosure, embodiments will be described with application to healthcare providers such as doctor's offices, hospitals, and clinics, although, it should be readily appreciated that the methods and apparatus described herein may be used in any of a variety of settings, including, but not limited to the examples provided above.

Healthcare providers may receive hundreds of faxes a day related to various aspects of their medical practice. For example, a medical clinic may receive laboratory results, patient referral forms, prescription information, medical billing information, etc. Each received fax is often classified to determine where the fax should be directed. Document classification may be performed by one or more humans who examine each document and assign it a classification based on information found in the document. These documents may be directed to an off-site facility for entry into EMRs.

Rather than sending the documents to the off-site facility with no classifying information, the healthcare providers, who have already done the document classification, may create document records for the documents and create associated barcodes for the documents. By attaching barcodes to the documents before sending them off-site, much time and effort is saved that would have been wasted by another person off-site re-classifying the documents.

Using barcodes is not, however, flawless. In the process of printing or transmitting the documents and barcodes, the barcode image may become unclear. Errors may also occur while scanning the barcode due to, for example, smudged ink, handwriting over the barcode, barcodes cut off by the margins of a fax machine, poorly maintained fax machines, noisy transmission lines, or any number of other problems that can affect the ability to accurately read a barcode. Misreading or failing to read barcodes in a collection of multiple documents causes errors such as merging two documents together or breaking a single document into multiple documents.

Figure 1:
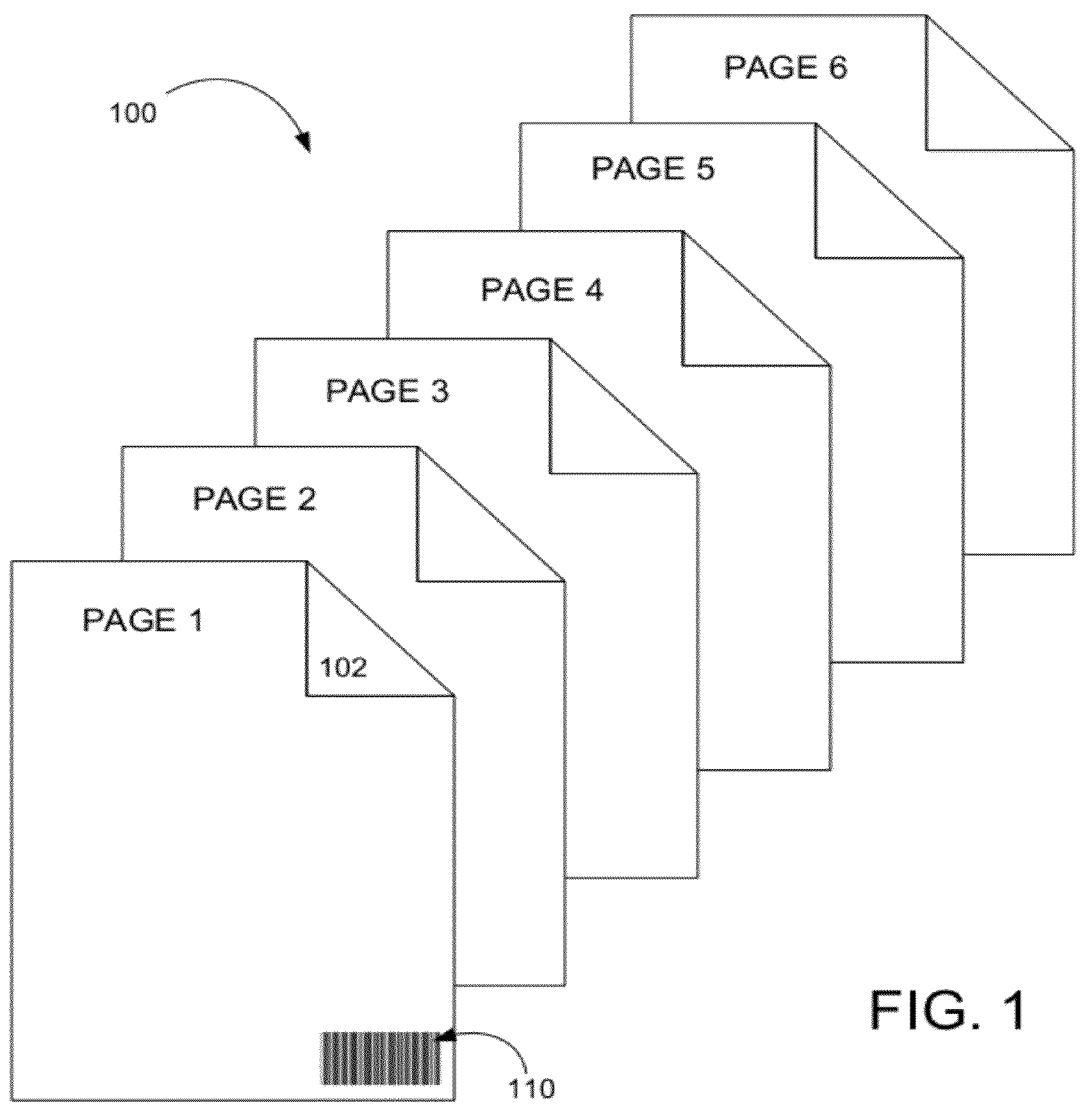
FIG. 1 is a schematic of a conventional multi-page barcoded document.

When barcoded documents are received for entry into the EMR database, a large number of documents are typically scanned. When the scanner can not read a barcode or misinterprets a barcode, documents may end up getting merged and pages end up associated with the wrong document. For example, FIG. 1 illustrates a barcoded document 100 generated using a conventional method where a barcode 110 is placed only on the first page 102 of a document. If barcode 110 is cut off, smudged or altered in some other way, the scanner will not read the barcode 110. If document 100 was received in the middle of hundreds of other similarly barcoded documents, the result is that document 100 will be merged with the document preceding it. This error occurs because the system assumes that every page without a barcode is part of the same document as the most recently scanned barcode. Thus, using this barcoding procedure may require a human to continuously monitor the scanning and classification.

Figure 2:
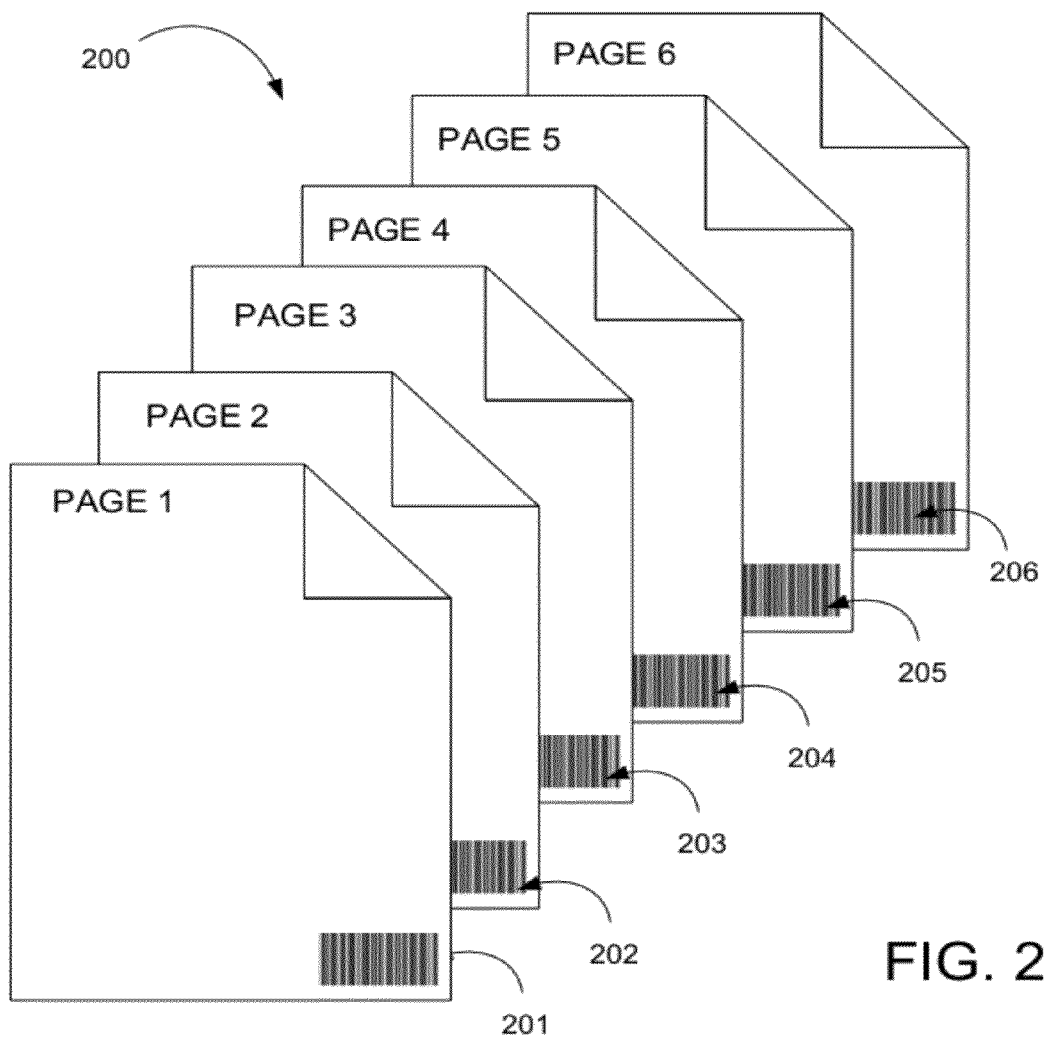
FIG. 2 is a schematic of a conventional multi-page barcoded document.

FIG. 2 illustrates document created by another prior art procedure for creating barcoded documents. In this method, every page of a document receives a distinct bar code 201-206. However, affixing a barcode to each and every page is unduly burdensome on the healthcare provider.

Applicants have recognized and appreciated that a procedure for handling barcoded documents whereby barcodes are placed on the first and last page of documents does not suffer from these inadequacies. By using two barcodes, missed barcodes may be automatically detected and the erroneous pages may be flagged for review by a human. Pages that are scanned without error may be automatically loaded into the EMR system quickly and efficiently.

Figure 3:
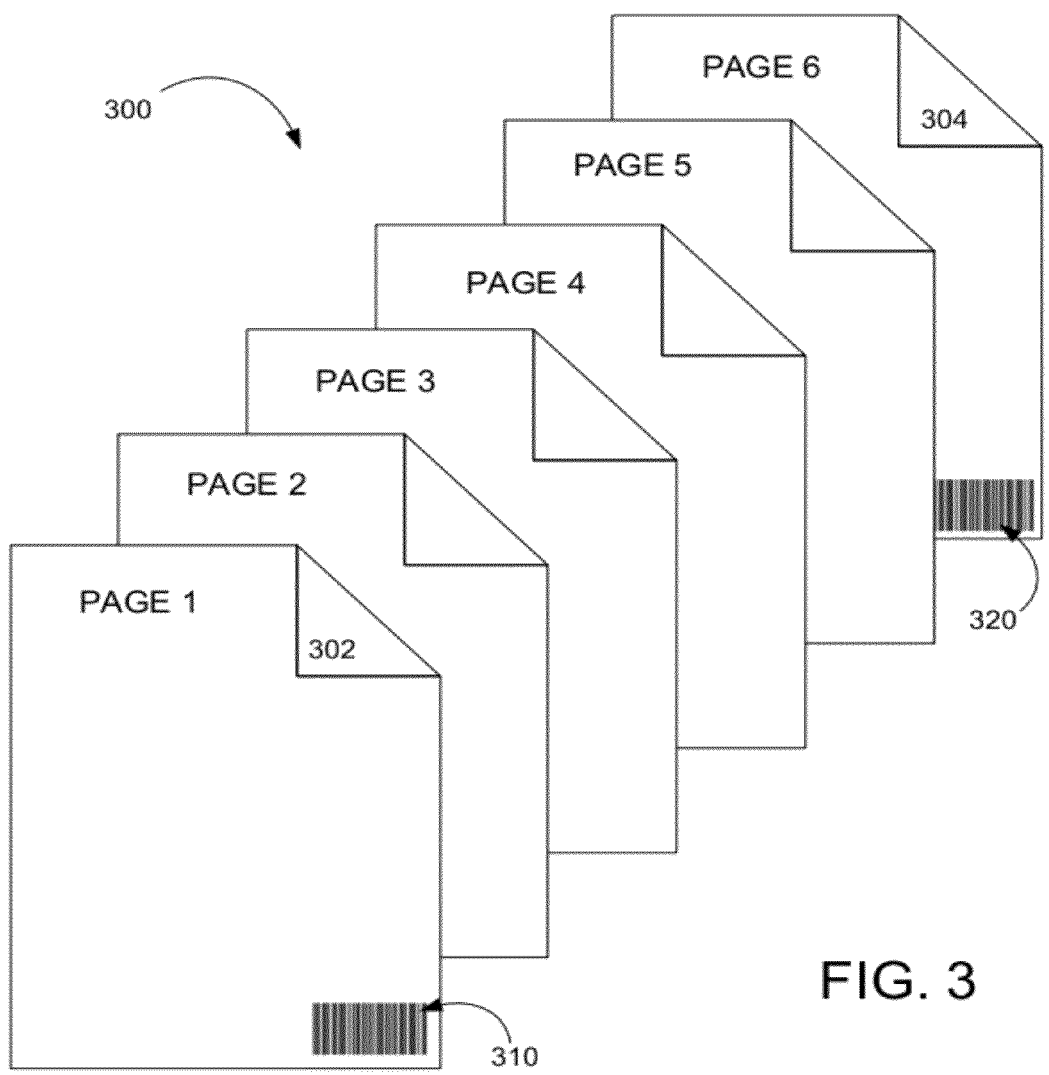
FIG. 3 is a schematic of a multi-page barcoded document from some embodiments of the present invention.

Some embodiments of the present invention are directed to methods and apparatus for creating documents with barcodes such that, when they are processed at a later time, a "safety net" is in place to catch barcode scanning errors as they occur. FIG. 3 illustrates a document 300 prepared in accordance with some embodiments. The document 300 has a first page 302 with a first bar code 310 and a last page 304 with a second bar code 320. In some embodiments, these two barcodes are different from one another. Though the two barcodes may be different, they may still have certain digits in common. For example, the barcode may be created as a combination of a client ID number, a document ID number and a separator number. The separator number may indicate whether the page associated with the bar code is the start of a document, the end of a document, or it may indicate that the document is a single page. For example, if Dr. A's practice is associated with client number 12345, and a bar coded is created for single page document number 987, the barcode may be 12345001987, where 001 represents the separator number indicating it is a single page document. If document number 987 was a multipage document, then a first barcode may be 12345100987 and a second barcode may be 12345010987, where 100 represents the separator number indicating that the page is the first page of the document and 010 represents the separator number indicating it is the final page of the document.

In some embodiments, barcodes may be one dimensional barcodes comprising a series of parallel lines that encode information using varying line widths and varying line spacing. In other embodiments, barcodes may be two dimensional barcodes comprising a two dimensional pattern of rectangles, dots, hexagons and/or other shapes used to encode information.

Figure 4:
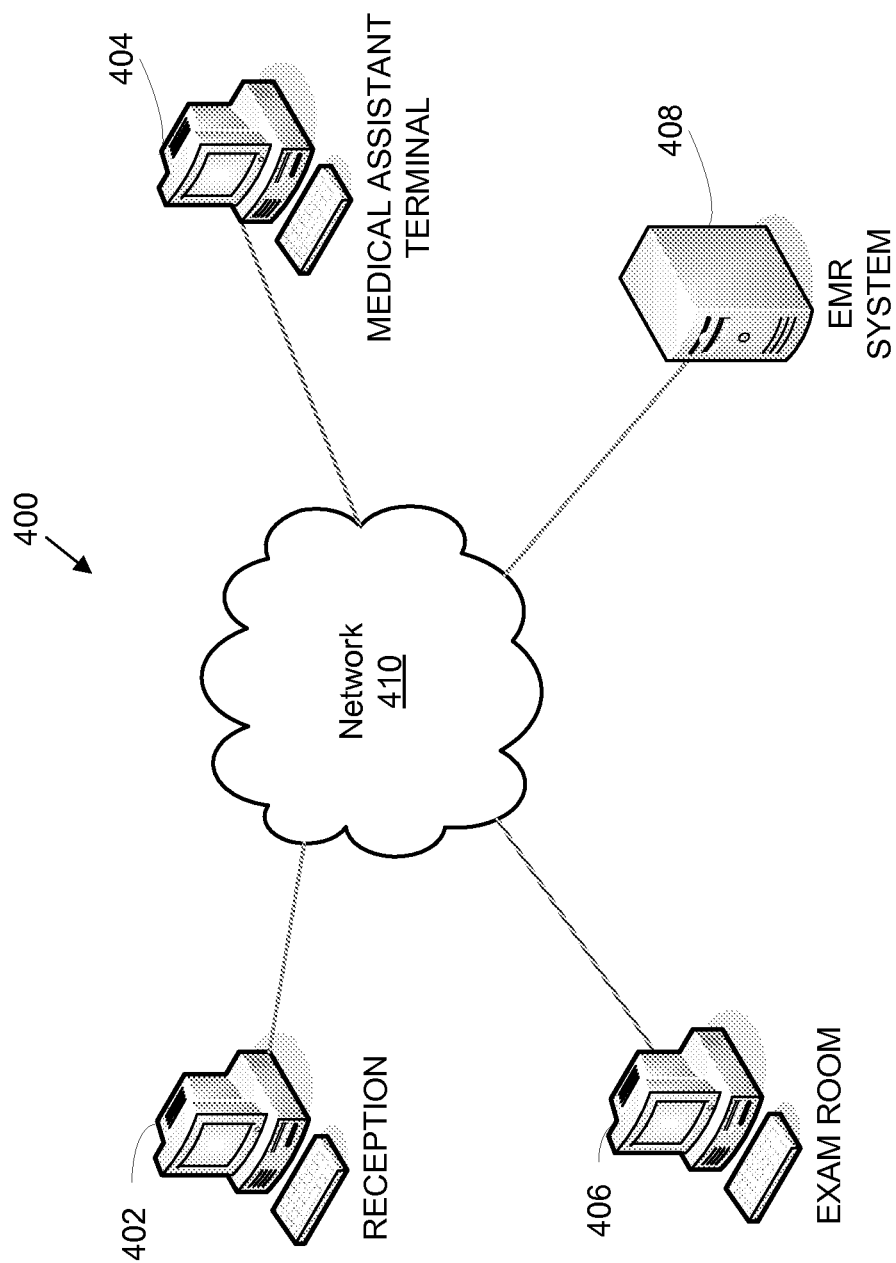
FIG. 4 is a schematic of a network environment in which embodiments of the present invention may be employed.

FIG. 4 illustrates an exemplary networked system 400 on which some embodiments of the invention may be employed. Networked computers 402, 404 and 406 may be located at a medical practice, and EMR system 408 may be located remotely at some off-site facility. Network 410 may be any type of local or remote network including, for example, a local area network (LAN) or a wide area network (WAN) such as the Internet. In the example of FIG. 4, four networked computers are shown. However, it should be appreciated that network 410 may interconnect any number of computers of various types and the networked system of FIG. 4 is provided merely for illustrative purposes. For example, EMR system 408 may be connected via network 410 (or other networks) to a plurality of computers at a plurality of medical practice locations to provide practice management services to each of the connected medical practices. As should be appreciated from the foregoing, embodiments of the invention may be employed in a networked computer system regardless of the type or network size or configuration.

In some embodiments, a doctor may be using a computer in an exam room 406 while seeing a patient. The doctor may be handwriting notes or using other documents. The computer 406 is connected to the EMR system 408 and is displaying the current patient's EMR. In order to incorporate the notes into the patient's EMR, the doctor may use the computer to select the type of document that is being used and the doctor may also enter whether the document is a single page or multiple pages. A document record will be created for this document. One or two barcodes will be generated based on the information received from the doctor and/or the information from the created document record, such as document number and client number. The barcodes may be printed on stickers that can be attached to the first and last page of the document. In some embodiments, the document may then get sent to an off-site facility where the document will be scanned and incorporated into the patient's EMR.

In some embodiments, a receptionist using computer 402 may be welcoming a patient to the medical practice for their appointment. There may be initial paperwork to fill out prior to the appointment, including, for example, a patient intake form. Computer 402, being connected to EMR system 408 can create a personalized patient intake form with certain information already entered. When the form is created, a document record for the intake form is created and one or two barcodes is generated based on whether the document comprises multiple pages or a single page. Rather than printing the barcodes to stickers that can be placed on the document, the barcodes may be incorporated directly into the pages of the document and, thus, the document will be printed with barcodes already included. The patient will complete any missing information from the intake form and when it is complete, the document may then get sent to an off-site facility where the document will be scanned and incorporated into the patient's EMR.

In some embodiments, a medical assistant using computer 404 may enter documents related to prescriptions, lab results or other patient records into the EMR system 408. The medical assistant can create barcodes for the documents as described above by either printing barcode sticker or printing barcodes directly on newly created documents.

The healthcare provider is not limited to sending each barcoded document individually to the off-site facility. In fact, it is common for multiple documents associated with multiple patients and multiple doctors to be saved over the course of the day and sent to be processed all at once. By way of example, not limitation, the documents may be sent by fax, courier, mail, a secure electronic communication system or by any other method.

Figure 5:
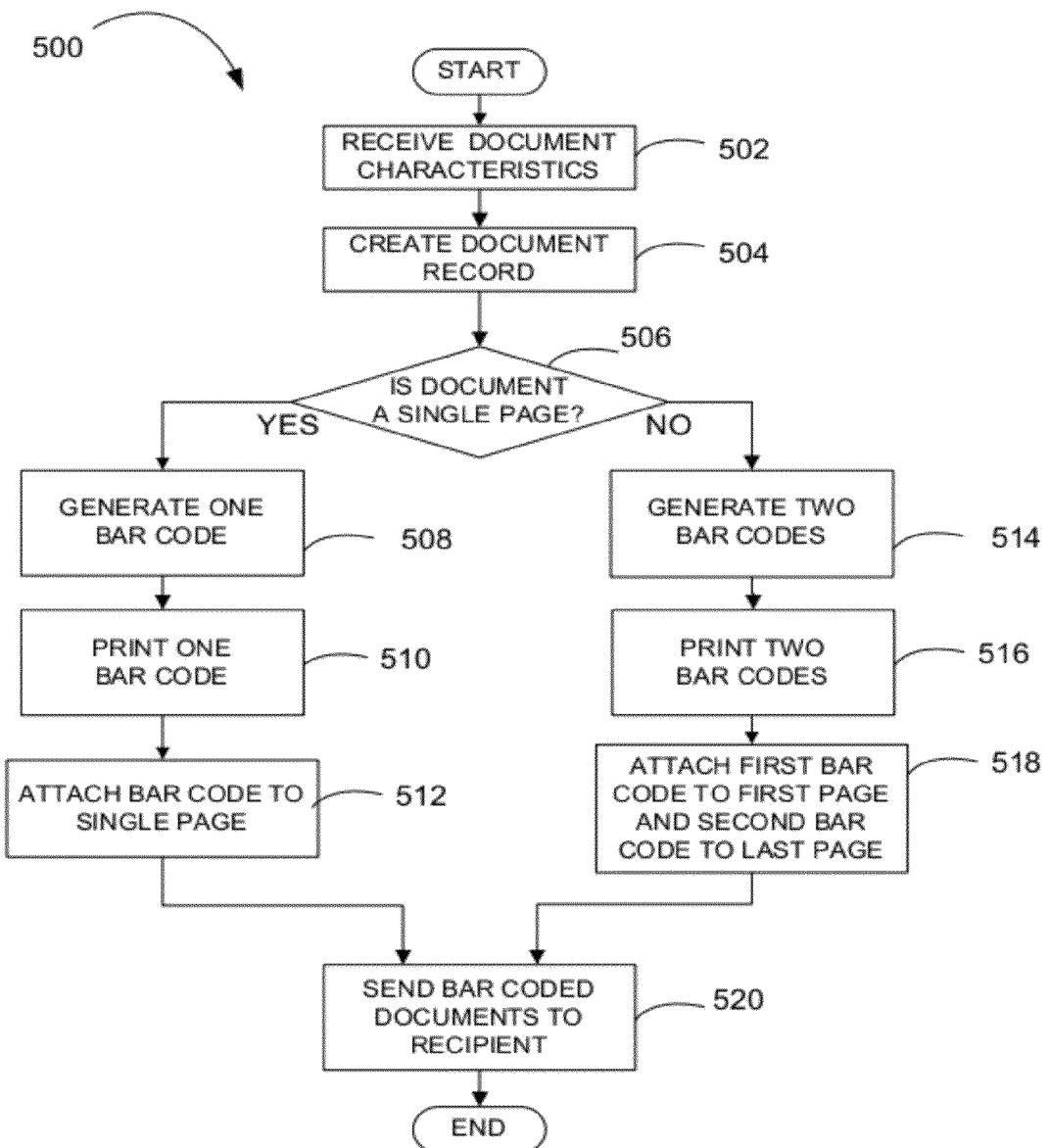
FIG. 5 is a flow diagram of a method for creating barcoded documents according to some embodiments of the present invention.

FIG. 5 illustrates a flow diagram of a method 500 for creating barcoded documents according to some embodiments of the present application. By example, and not limitation, this method may be performed by computers 402, 404, 406, EMR system 408, or any other computer with access to EMR system 408. One of ordinary skill in the art would also understand that some of the acts in the method may be performed on one computer system while others may be performed on another computer or the EMR system 408.

At act 502, document characteristics are received. In some embodiments, these characteristics are received by a computer from a user of a computer. In some embodiments, the characteristics may be received from another computer or EMR system 408. By example, and not limitation, the document characteristics may comprise information such patient name, date, doctor name, document type (e.g. doctor notes, prescription, patient intake form, lab results, etc.), number of pages, and an indicator of whether the document is a single page or multiple pages. If the specific number of pages is one of the characteristics, it may play the role of indicating whether the document is a single page or not.

In response to receiving the document characteristics, a document record is created for the document at act 504. In some embodiments this document record may be created on a computer at the healthcare provider's office and sent to EMR system 408. In other embodiments, the document record may be created by the EMR system 408 itself. The document record may include some or all of the document characteristics that were received at act 502. In some embodiments, a document number, which is typically not included in the document characteristics, is created and included in the document record. In some embodiments, the document record is created before electronic copies of the document are available to the system. When electronic copies of the document are made available to EMR system 408, the electronic document will be associated with the document record as described in more detail below.

At act 506, it is determined whether the document is a single page document or whether the document comprises multiple pages. In some embodiments, this information is attained directly from the document characteristics that were received at act 502. In other embodiments, this information is attained by consulting the document record that was created at act 504.

If, at act 506, it is determined that the document is a single page, the flow continues to act 508 where a single barcode is generated. In some embodiments, the bar code is generated using information from the document record. By way of example and not limitation, the act of generating a bar code may use a client number, a patient number, a document number and/or whether the document is a single page or multiple pages. In some embodiments, information may be placed directly into the bar code. For example, the first five digits of the bar code may be a client number, wherein the client number is associated with the healthcare provider. For example, Dr. A's medical office may be client number 12345. Thus, every barcode generated for documents of Dr. A's medical office may begin with the client number 12345. In some embodiments, a document number that is created when the document record is created in step 504 may be used directly in the bar code. For example, if the document number is 9876, then the final 4 digits of the bar code associated with the document may also be 9876. In some embodiments, there may be a "separator number" that is used to separate the customer number and the document number. The separator number carries information about whether the document is a single page or not. For example, if the document is a single page, then the separator may be 001, which indicates that the document is a single page. In the above, example, the full barcode for a single page document with documents number 9876 from Dr. A's medical office may include 123450019876. One of ordinary skill in the art would understand that the above choice of numbers and methods for combining the numbers into a barcode number is merely exemplary and is the invention is not limited to these particular embodiments.

After the bar code is generated at act 508, the bar code may be printed at act 510. In some embodiments, the bar code is printed onto a sticker that may be attached to the document. In other embodiments, the bar code is printed on the document itself while the document is being printed.

At act 512, the bar code is attached to the single page document. In embodiments where a sticker is printed at act 510, the barcode is attached by adhering the sticker to the single page. In embodiments where the barcode is printed on the document as the document is being printed, the "attaching" step is simultaneous with the printing step and the barcode is "attached" during the printing process.

After the document is barcoded, the document is sent to a recipient at act 520. In some embodiments, the recipient is an employee at an off-site facility that processes barcoded documents. As discussed above, there are many possible procedures for sending the document to an off-site facility including, but not limited to, fax, mail, courier, or some secure electronic transmission system. In some embodiments, the document is not sent individually, but instead is sent with many other documents. It is not uncommon for a medical office to send hundreds of documents at a time to the off-site facility.

Returning to decision block 506, if the document is determined to not be a single page, then it is a multi-page document. Much of the processing is similar as to when the document is a single page, except that in this embodiment two barcodes are generated at act 514. In some embodiments, the generation of a barcode is the same as that described in conjunction with act 508. The main difference in that specific example is that the separator number will be different than that of a single page document. As mentioned above, the separator number used in a barcode for a single document was 001. When a scanner reads the barcode, the scanner will immediately recognize that the document is a single page document because of this separator number. In some embodiments of act 514, a different separator is used for the first page and the last page of the multipage document. For example, the first page separator number may be 100 and the last page indicator number may be 010. In some embodiments, the two barcodes are the same except for the separator number. In a similar example as above, if Dr. A's office creates a barcode for a multipage document with document number 9876, then the barcode for the first page will be 123451009876 and the barcode for the last page will be 123450109876. One of ordinary skill in the art would understand that there are many other equivalent ways to implement the same concept described in the examples above. The present invention is not limited to the particular examples and embodiments described above.

After the two barcodes are generated at act 514, the barcodes are printed. Again, this step is similar to the act of printing 510 that occurs for a single page document. In some embodiments, the barcodes are printed on stickers that can be attached to the first and last page of the document. In other embodiments, the barcodes may be incorporated directly into the first and last page of the document when the document is printed.

At act 518, the first barcode is attached to the first page and the second barcode is attached to the second page. In the embodiment where the barcodes are printed on stickers in act 516, the barcodes are attached by adhering the stickers to the first and last page of the document. In the embodiment where the barcodes are printed directly on the first and last page of the document when the document is printed, the act of "attaching" occurs simultaneously with the act of printing 516.

After act 518, the barcoded documents are sent to a recipient at act 520, which was already discussed above.

The above method is but one embodiment of the present invention. One of ordinary skill in the art would recognize that there are many equivalent ways to implement the invention that differ from the specific examples given above. These variations are intended to be within the scope of the present invention.

Figure 6:
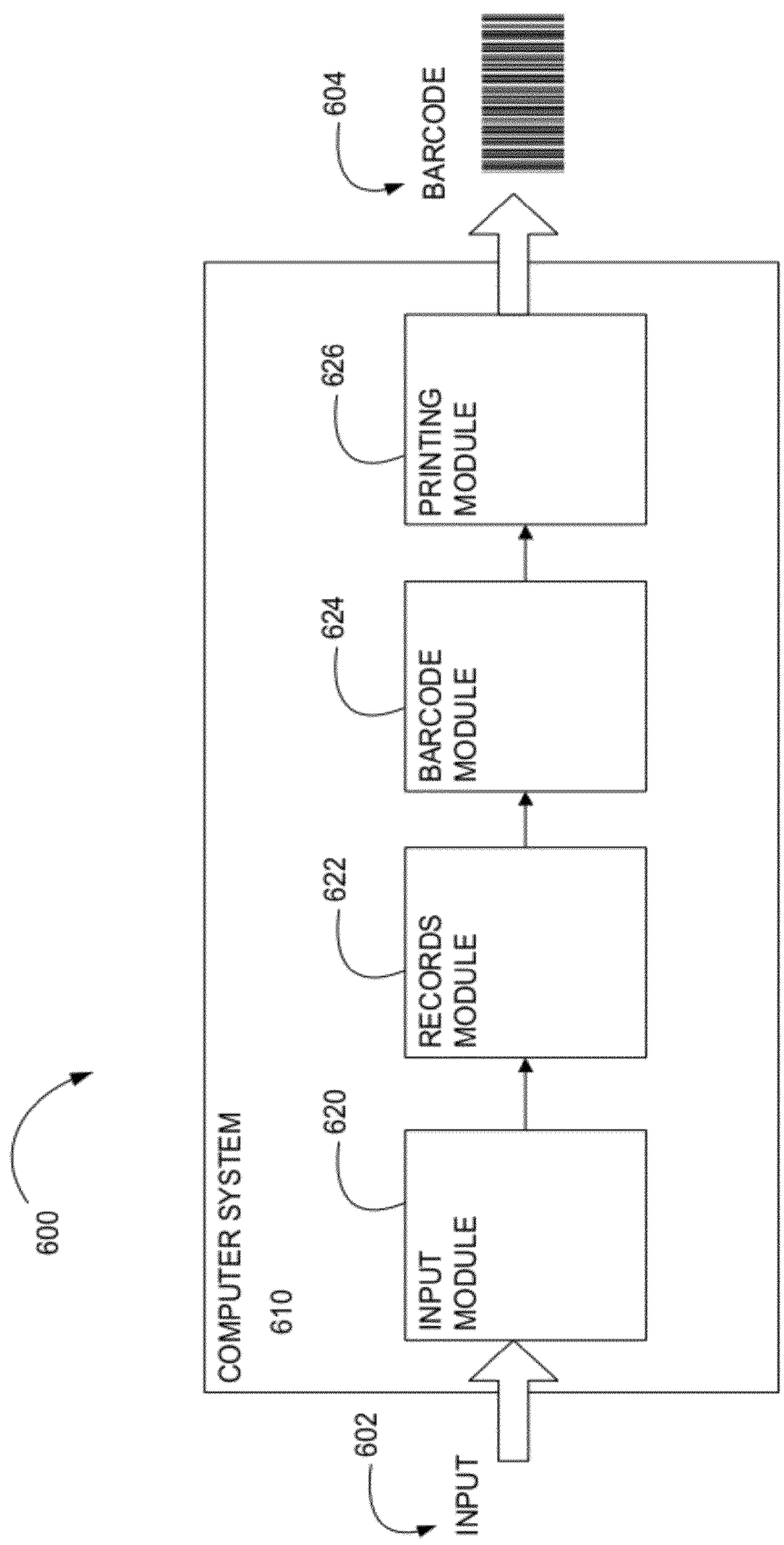
FIG. 6 is a schematic of a computing environment where embodiments of the present invention may be employed.

FIG. 6 illustrates a schematic diagram of a computing environment 600 according to some embodiments of the present invention. A computer system 610 comprising a plurality of modules may be used in some embodiments. One of ordinary skill in the art would understand that modules may consist of hardware, software or a combination of hardware and software. Software may be executed on a processor (not shown) of computer system 610.

In some embodiments, an input module 620 receives input 602. Input 602 may be received from a human operator of computer system 610 or from other computer system that can transmit input information to the input module. In some embodiments, the input is information related to the barcoded document. The input information may include document characteristics such as the type of document, the patient's name, the healthcare provider's identity or any of a wide variety of document characteristics. In some embodiments, the input information may comprise length information indicative of whether the document is a single page document or a multipage document. This length information may comprise a numerical page number field that indicates the exact number of pages in the document. In some embodiments, the length information comprises a flag that simply indicates whether the document is a single page or not.

In some embodiments, computer system 610 comprises a records module 622 that creates a document record for the barcoded document. In some embodiments, the records module uses the input information 602 and document characteristics received by the input module 620 to generate the document record. The document record may comprise an entry in a document maintenance system. In some embodiments, the document maintenance system is a database and the document record comprises an entry in the database. The document record may be based, at least in part, on input 602. In some embodiments, the input 602 received by input module 620 may be used directly as part of the document record. Some embodiments create other document characteristics that are included in the document record but were not a part of input 602. For example, the document record may comprise a document number and/or a date associated with the creation or modification of the document record that is generated at the same time as the document record itself.

Some embodiments of computer system 610 comprise a barcode module 624 for generating barcodes 604. In some embodiments, the barcode module 624 uses input information 602 and/or information from the document record to generate the barcode. For example, the barcode may use a document number, client number or patient number to generate the barcode. In some embodiments, the information (e.g. document number) may be directly incorporated into the barcode number. For example, the last digits of a barcode number may be exactly the same as the document number.

In some embodiments, barcode module 624 may use the length information to determine how many barcodes to print and what type of barcodes they should be. For example, the length information may indicate that a document is a single page document. The barcode 604 may then be generated to indicate that the document is a single page document by incorporating a specific number into a portion of the barcode, the specific number always being used in barcodes generated for single page documents. The length information may, alternatively, indicate that the document comprises multiple pages. The barcode generator 624 may then create two different barcodes for the document. One of the barcodes is specifically for the first page and the other is specifically meant to be placed on the last page of the document. In some embodiments, portions of the two barcodes may be the same.

For example, the document number may be a part of the barcode number and therefore that portion of the barcode would be the same for the two barcodes generated for that document. In some embodiments, a specific number may be incorporated into a portion of the barcode, the specific number always being used to indicate that a barcode is associated with the first page of a multipage document. A second number incorporated into a portion of the barcode may always be used to indicate that a barcode is associated with the last page of a multipage document.

In some embodiments, computer system 610 may comprise a printing module 626 for printing one or more barcodes 604. In some embodiments, the printing module sends commands to an external printer that may be attached to computer system 610. In other embodiments, printer hardware may be incorporated into the computer system 610 itself. In some embodiments, the barcode may be printed onto stickers which may then be adhered to pages of a document. In other embodiments, the printing module 626 may print the document itself and incorporate barcodes onto the first and last pages of the document itself without the need for printing and attaching stickers to the document.

Figure 7:
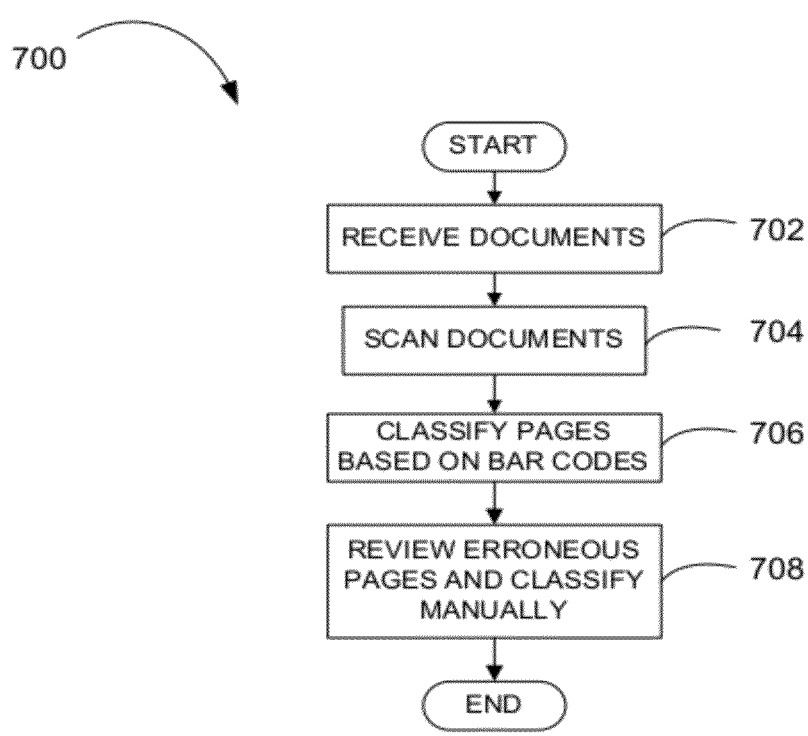
FIG. 7 is a flow diagram of a method for receiving and classifying barcoded documents according to some embodiments of the present invention.

FIG. 7 illustrates a flow diagram of a method 700 for receiving and classifying barcoded documents according to one embodiment of the present invention. At act 702, one or more documents may be received. For example, the documents may be received by fax, courier, mail, email, or via an electronic communication system. In some embodiments, a plurality of documents may be received from one or more different sources.

At act 704, the documents are scanned. In some embodiments, a digital image of each page of the plurality of documents is created using a scanner. In other embodiments, a digital image of each page is not necessary to classify the documents. Instead, a barcode reader that simply looks for and reads a barcode may be used.

At act 706, the pages of the plurality of documents are classified. In some embodiments, the classification is a procedure for separating the plurality of received pages into documents. The procedure implements a "safety net" for catching errors that occur when barcodes are not scanned properly, either by misreading them or completely missing them. In some embodiments, pages that are considered erroneous by the safety net are marked for manual review. For example, erroneous pages may be queued for review by a human in order to classify the pages manually. Further details of the classification process are discussed in detail in conjunction with FIG. 8.

At act 708, the pages that were classified as erroneous at act 706 are reviewed and classified manually. In some embodiments, digital images of the erroneous pages may be reviewed on a computer system that allows the user to review the pages electronically. In some embodiments, classifying the erroneous pages comprises determining details of the document and associating the document with a document record in an EMR system.

The above method is but one embodiment of the present invention. One of ordinary skill in the art would recognize that there are many equivalent ways to implement the invention that differ from the specific examples given above. These variations are intended to be within the scope of the present invention.

One of ordinary skill in the art would also recognize that the above method may be implemented partially, or entirely, on a computer system.

Figure 8:
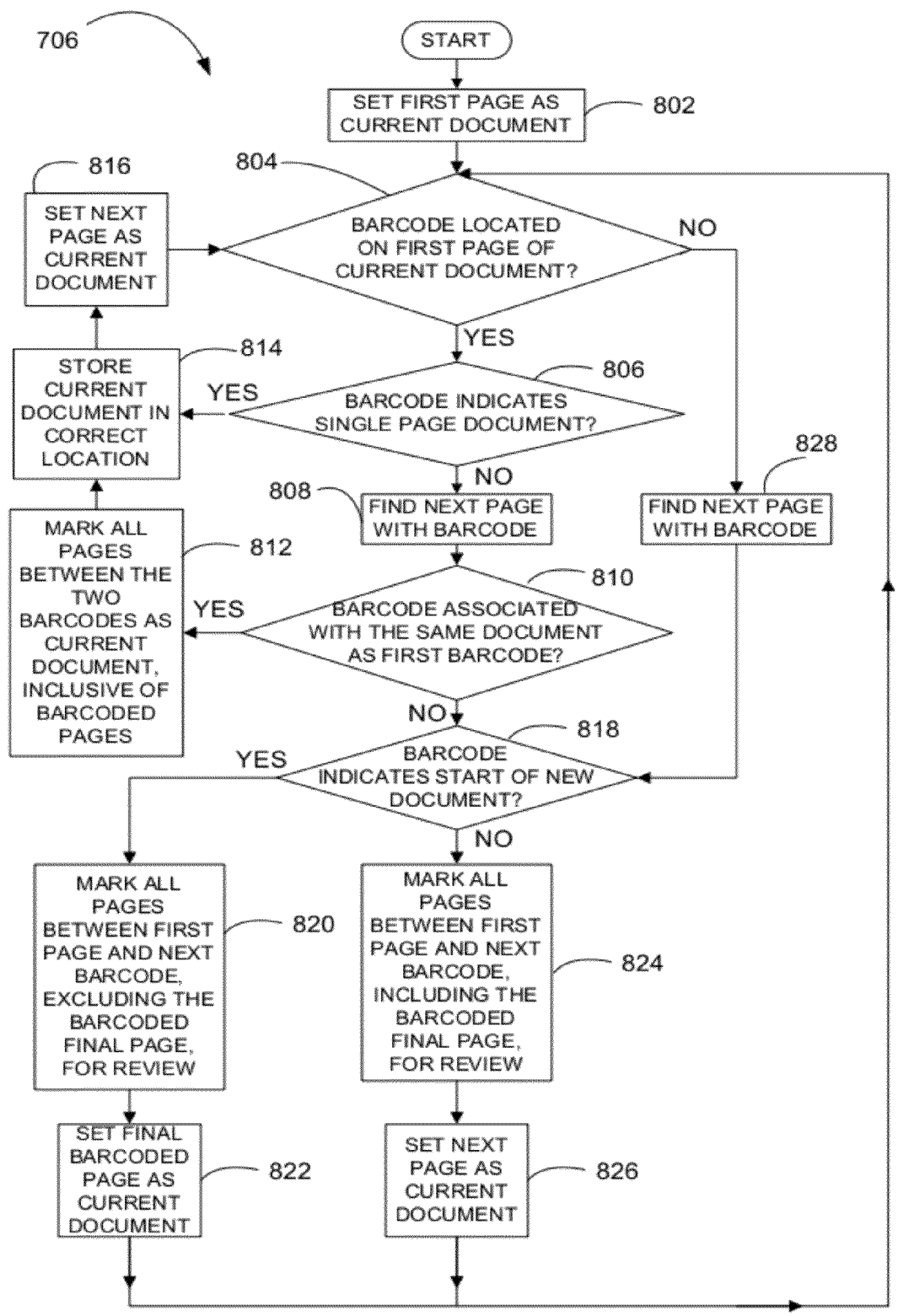
FIG. 8 is a flow diagram of a method for classifying barcoded documents and implementing a safety net according to some embodiments of the present invention.

FIG. 8 illustrates a flow diagram of a method 706 for classifying barcoded documents and implementing a bar code safety net according to one embodiment of the present invention. One of ordinary skill in the art would understand that the details of FIG. 8 are but one possible embodiment for classifying barcoded documents at act 706 of FIG. 7. As discussed above regarding FIG. 7, in some embodiments, when act 706 starts a plurality of barcoded documents has already been received and scanned. In some embodiments, this means that digital images of each page of the plurality of barcoded documents are available.

At act 802, the first page of the plurality of pages is set to be the "current document." The current document is the document that is presently being classified by method 706. The classifying method 706 will iterate through all the documents of the plurality of received documents until there are none left.

After setting the first document as the current document at step 802, method 706 begins its first iteration by determining whether a barcode can be found on the first page of the current document at act 804. If a barcode is located, method 706 continues at act 806 where it is determined whether the barcode indicates that the document is a single page document. As discussed above, in some embodiments, the barcode number may directly reflect whether the document is a single page document or a multipage document using a separator code or some other set number within the barcode to directly convey this information. In some embodiments acts 804 and 806 occur simultaneously such that the locating and reading of the barcode are all one single action.

If the document is not a single page, i.e. that the current document is a multipage document, at act 806, then method 706 continues at act 808 where the next barcode is found. In some embodiments, the barcode directly indicates whether the document is a single page or not. In some embodiments, the next barcode is found by locating the next page that comprises a barcode in the plurality of documents. For example, if the current document is a six page document 300, as illustrated in FIG. 3, locating the next barcode comprises searching each page after page 302 for a barcode until barcode 320 is found on the last page 304.

After the next barcode is located at act 808, method 706 continues to act 810 where it is determined whether the second barcode is associated with the same document as the first barcode. As discussed above, in some embodiments, if the barcodes belong to the same document, the barcodes may be substantially similar apart from a portion of the barcode that indicates whether the page associated with the barcode is the first page or last page of a multipage document. In some embodiments, whether the two barcodes are associated with the same document may be determined by comparing the barcodes and determining if the barcode is the same except for the portion of the barcode that indicates whether it is a first or last page and also determining that the second barcode is associated with the last page of a document.

If it is determined that the second barcode is associated with the same document as the first barcode, then method 706 continues at act 812 where all the pages between the first page and the page associated with the second barcode are marked as the current document, including the last page which comprises the second barcode and the first page, which was already set as part of the current document at act 802. In some embodiments, marking pages as part of the current document may comprise gathering the images of all the pages into a single document file.

At act 814, the current document is stored in the correct location. In some embodiments, the correct location may be within a document storage database. Storing the document may comprise associating the document images with a document record in a document database. The document record may be found using the barcodes, which associate the document with a document record. In some embodiments, the document database may be an EMR system. In other embodiments, storing the document images in the correct location may comprise referring to a document record associated with the barcoded document, wherein the document record indicates a location in a computer storage system where the document should be stored.

After storing the document, the classification of the current document is complete and the method 706 continues at act 816 where the page that immediately follows the last page of the document that was stored at act 814 is set as the current document. Method 706 then continues by returning to act 804 and processing the document that was just set as the new current document. As stated above in conjunction with act 802, method 706 will continue to loop through all the plurality of documents until there are none left to classify.

The above portion of method 706 describes one embodiment of the present invention where no error in the barcoding is found. In the above description, a multipage document was classified by using identifying barcodes on the first and last page of the document as is illustrated by, for example, document 300 in FIG. 3.

The benefits of the barcode safety net become apparent when it is determined at act 810 that the second barcode does not correspond to the same document as the first barcode. In this case, method 706 continues from act 810 to act 818 where it is determined whether the second barcode indicates the start of a new document. As already discussed, the barcode itself contains inherent information regarding the type of document that is associated with the barcode. In some embodiments, the barcode indicates that the associated page is the start of a new document when the barcode indicates that the page is a single page document or when the barcode indicates that its associated page is the first page of a multipage document.

If it is determined at act 818 that the second barcode is indeed the start of a new document, then method 706 continues at act 820. Determining that the second barcode is not associated with the current document at act 810 and then determining that the second barcode is the start of a new document at act 818 indicates that a barcode error occurred. In this case, one possible explanation for the error is that the barcode associated with the last page of the current document was not able to be scanned properly or did not exist. It is also possible that multiple barcodes were missing or not readable. Therefore, method 706 continues at act 820 where all pages between the page associated with the first bar code and the page associated with the second barcode, excluding the page associated with the second barcode itself but including the page associated with the first barcode, are marked for review. In some embodiments, marking pages for review adds the pages to a queue of pages that will be reviewed manually by a human.

At act 822, the page associated with the second barcode is set as the current document. In some embodiments, method 706 then returns to act 804 where the next iteration continues acting on the new current document. In other embodiments, since the page associated with the second barcode has already been identified as the first page of a new document, method 706 may skip directly to act 806.

Returning to the decision at act 818, if it is determined that the second barcode does not indicate the beginning of a new document, then method 706 continues at act 824. Determining that the second barcode is not associated with the current document at act 810 and then determining that the second barcode is not the start of a new document at act 818 indicates that a barcode error occurred. In this case, one possible explanation for the error is that the barcode associated with the last page of the current document as well as a barcode associated with the first page of a different document was not able to be scanned properly or did not exist. It is also possible that even more barcodes were missing or not readable. Therefore, method 706 continues at act 824 where all pages between the page associated with the first bar code and the page associated with the second barcode, including the page associated with the second barcode itself as well as the page associated with the first barcode, are marked for review. In some embodiments, marking pages for review adds the pages to a queue of pages that will be reviewed manually by a human.

At act 826, the page directly after the page associated with the second barcode is set as the current document. In some embodiments, method 706 then returns to act 804 where the next iteration continues acting on the new current document.

Returning to act 804, if it is determined that the first page of the current document does not contain a barcode, then method 706 continues to act 828 where the next page with a barcode is found. Act 828 locates the page with the next barcode in the same way as discussed at act 808. After the next barcode is located, method 706 continues at act 818 and the method progresses in the same way as discussed above, except that the first page of the current document is not associated with a barcode. This fact alone implies that there is a barcode error and the pages associated with the error need to be reviewed by a human.

The above portions of method 706 describe some embodiments of the present invention that implement a barcode safety net. The safety net catches errors that occur due to the imperfect nature of barcode technology and mark erroneous pages for review.

Returning to act 806, if it is determined that the barcode on the first page of the current document indicates that the document comprises only a single page, then method 706 continues at act 814 where the document is stored in the correct location as discussed above.

The above method is but one embodiment of the present invention. One of ordinary skill in the art would recognize that there are many equivalent ways to implement the invention that differ from the specific examples given above. These variations are intended to be within the scope of the present invention.

One of ordinary skill in the art would also recognize that the above method may be implemented partially, or entirely, on a computer system.

Having thus described several aspects of some embodiments of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of creating a barcoded document, the barcoded document having a first page associated with a beginning of the barcoded document, a final page associated with an end of the barcoded document, and at least one intermediate page between the first page and the final page, the method comprising acts of:
    creating a document record in an electronic medical record system based, at least in part, on document characteristics and a client identification number identifying a healthcare provider associated with the electronic medical record system, the act of creating performed by at least one processor;
    generating a first barcode associated with the first page of the barcoded document, wherein the first barcode is generated based, at least in part, on length information associated with a length of the barcoded document and the client identification number, and at least a portion of the first barcode indicates that the barcoded document comprises multiple pages; and
    generating a second barcode associated with the final page of the barcoded document,
    wherein none of the at least one intermediate page is associated with a barcode generated based, at least in part, on the length information.

2. The method of claim 1, further comprising acts of:
    printing the first barcode;
    attaching the first barcode to the first page of the barcoded document;
    printing the second barcode; and
    attaching the second barcode to the final page of the barcoded document.

3. The method of claim 2, wherein the act of attaching the first barcode occurs at the same time as the printing of the first barcode.

4. The method of claim 1, wherein the document record comprises a document number and the act of generating the first barcode is based on the document number.

5. The method of claim 1, wherein the act of generating the second barcode is based on the client identification number.

6. The method of claim 1, wherein the act of generating the second barcode is based on the length information.

7. An apparatus for creating a barcoded document, the barcoded document having a first page associated with a beginning of the barcoded document, a final page associated with an end of the barcoded document, and at least one intermediate page between the first page and the final page, the apparatus comprising:
    a records module for creating a document record in an electronic medical record system based, at least in part, on information related to the barcoded document and a client identification number identifying a healthcare provider associated with the electronic medical record system;
    a barcode module for:
        generating a first barcode to be included on the first page of the barcoded document, wherein the first barcode is generated based, at least in part, on length information associated with a length of the barcoded document and the client identification number, and at least a portion of the barcode indicates that the barcoded document comprises multiple pages; and
    generating a second barcode to be included on the final page of the barcoded document,
    wherein none of the at least one intermediate page is associated with a barcode generated based, at least in part, on the length information.

8. The apparatus of claim 7, further comprising:
    a printing module for printing the first barcode and the second barcode.

9. The apparatus of claim 7, wherein:
    the document record comprises a document number; and
    the barcode module uses the document number to generate the first barcode.

10. The apparatus of claim 9, wherein:
    the barcode module uses the client identification number to generate the second barcode.

11. The apparatus of claim 7, wherein:
    the barcode module uses the length information to generate the second barcode.

12. A non-transitory computer readable medium, encoded with a series of instructions, that when executed on a computer, perform a method of creating a barcoded document, the barcoded document having a first page associated with a beginning of the barcoded document, a final page associated with an end of the barcoded document, and at least one intermediate page between the first page and the final page, the method comprising acts of:
    creating a document record in an electronic medical record system based, at least in part, on at least a portion of document characteristics and a client identification number identifying a healthcare provider associated with the electronic medical record system, the act of creating performed by at least one processor;
    generating a first barcode associated with the first page of the barcoded document, wherein the first barcode is generated based, at least in part, on length information associated with a length of the barcoded document and the client identification number, and at least a portion of the first barcode indicates that the barcoded document comprises multiple pages; and
    generating a second barcode associated with the final page of the barcoded document, wherein none of the at least one intermediate page is associated with a barcode generated based, at least in part, on the length information.

13. The non-transitory computer readable medium of claim 12, wherein the method further comprises:
   printing the first barcode;
   attaching the first barcode to the first page of the barcoded document;
   printing the second barcode; and
   attaching the second barcode to the final page of the barcoded document.

14. The non-transitory computer readable medium of claim 13, wherein the act of attaching the first barcode occurs at the same time as the printing of the first barcode.

15. The non-transitory computer readable medium of claim 12, wherein the document record comprises a document number and the act of generating the first barcode is based on the document number.

16. The non-transitory computer readable medium of claim 12, wherein the act of generating the second barcode is based on the client identification number.

17. The non-transitory computer readable medium of claim 12, wherein the act of generating the second barcode is based on the length information.

* * * * *